(12) United States Patent
Gu

(10) Patent No.: US 11,835,492 B2
(45) Date of Patent: Dec. 5, 2023

(54) METHOD FOR PREPARING SAMPLE FOR WAFER LEVEL FAILURE ANALYSIS

(71) Applicant: CHANGXIN MEMORY TECHNOLOGIES, INC., Hefei (CN)

(72) Inventor: Wen-Lon Gu, Hefei (CN)

(73) Assignee: CHANGXIN MEMORY TECHNOLOGIES, INC., Anhui (CN)

( * ) Notice: Subject to any disclaimer, the term of this patent is extended or adjusted under 35 U.S.C. 154(b) by 193 days.

(21) Appl. No.: 17/407,247

(22) Filed: Aug. 20, 2021

(65) Prior Publication Data

US 2022/0050035 A1 Feb. 17, 2022

Related U.S. Application Data

(63) Continuation of application No. PCT/CN2021/099725, filed on Jun. 11, 2021.

(30) Foreign Application Priority Data

Aug. 14, 2020 (CN) .......................... 202010818018.8

(51) Int. Cl.
G01N 3/40 (2006.01)

(52) U.S. Cl.
CPC ....... *G01N 3/40* (2013.01); *G01N 2203/0076* (2013.01)

(58) Field of Classification Search
CPC ...................................................... G01N 3/40
USPC ............................................................ 73/78
See application file for complete search history.

(56) References Cited

U.S. PATENT DOCUMENTS

| 6,140,603 | A | * | 10/2000 | Hwang | ................ | B23K 26/361 |
| | | | | | | 219/121.68 |
| 7,211,526 | B2 | | 5/2007 | Iri | | |
| 9,653,644 | B2 | | 5/2017 | Tamemoto et al. | | |
| 2005/0199592 | A1 | | 9/2005 | Iri | | |
| 2007/0298529 | A1 | | 12/2007 | Maeda | | |
| 2017/0098733 | A1 | | 4/2017 | Tamemoto et al. | | |

FOREIGN PATENT DOCUMENTS

| CN | 1555090 A | 12/2004 |
| CN | 2689218 Y | 3/2005 |
| CN | 1657220 A | 8/2005 |

(Continued)

OTHER PUBLICATIONS

Goto. Translation of JP-2003203959-A. Published Jul. 2003. Accessed Apr. 2023. (Year: 2003).*

(Continued)

*Primary Examiner* — Walter L Lindsay, Jr.
*Assistant Examiner* — Philip T Fadul
(74) *Attorney, Agent, or Firm* — Cooper Legal Group, LLC

(57) ABSTRACT

Embodiments of the present application provide a method for preparing a sample for wafer level failure analysis. The method includes that: a plurality of splitting points are formed on a surface of a selected region of a to-be-analyzed sample along a preset direction, the plurality of splitting points being arranged in a straight line; and the to-be-analyzed sample is split by taking the straight line where the plurality of splitting points are located as a splitting line, to expose a cross section of a side surface of the to-be-analyzed sample and form the sample for the wafer level failure analysis.

5 Claims, 9 Drawing Sheets

(56) References Cited

FOREIGN PATENT DOCUMENTS

| | | | |
|---|---|---|---|
| CN | 102326232 A | | 1/2012 |
| CN | 102384867 A | | 3/2012 |
| CN | 103645078 A | | 3/2014 |
| CN | 203631526 U | | 6/2014 |
| CN | 103900868 A | | 7/2014 |
| CN | 203726650 U | | 7/2014 |
| CN | 104786380 A | | 7/2015 |
| CN | 108918552 A | | 11/2018 |
| JP | 2003203959 A | * | 7/2003 |
| JP | 2003203959 A | | 7/2003 |
| JP | 2017069510 A | | 4/2017 |

OTHER PUBLICATIONS

First Office Action of the Chinese application No. 202010818018.8, dated Jan. 18, 2023, 10 pgs.
International Search Report in the international application No. PCT/CN2021/099725, dated Sep. 10, 2021, 3 pgs.

* cited by examiner

METHOD FOR PREPARING SAMPLE FOR WAFER LEVEL FAILURE ANALYSIS

CROSS-REFERENCE TO RELATED APPLICATIONS

This is a continuation of International Application No. PCT/CN2021/099725, filed on Jun. 11, 2021, which claims priority to Chinese patent application No. 202010818018.8, filed on Aug. 14, 2020 and entitled "Method for Preparing Sample for Wafer Level Failure Analysis". The disclosures of International Application No. PCT/CN2021/099725 and Chinese patent application No. 202010818018.8 are hereby incorporated by reference in their entireties.

TECHNICAL FIELD

The present disclosure relates to the technical field of semiconductor manufacturing, and particularly to a method for preparing a sample for wafer level failure analysis.

BACKGROUND

In physical structure analysis of wafer level failure analysis, the analysis of cross section is a common and effective method for physical analysis. Tools used for failure analysis mainly include a tool for processing cross section (for example, a Focused Ion Beam (FIB) analyzer and a device for grinding and polishing), and an apparatus for cross section observation (for example, an Optical Microscope (OM) and a Scanning Electron Microscope (SEM)), and the like.

At present, a method for preparing a cross section sample includes manual splitting and preparation by the tool for processing the cross section. For some target samples with an analysis structure size greater than or equal to 10 micrometers (μm), even for some wafer samples with a repeated structure, the preparation difficulty of the cross section sample is not high, and the preparation of the cross section sample may be directly performed by using a manual splitting method to reduce costs. However, since the precision of the manual splitting is limited and a target sample required for analysis may not be accurately obtained, it is necessary to use the certain tools for processing the cross section, for example, the focused ion beam analyzer and the device for grinding and polishing. But the costs of the focused ion beam analyzer and the device for grinding and polishing are high, and if there is photoresist on a surface of a wafer, the photoresist with poor hardness may be deformed during sample preparation, which will also affect the subsequent failure analysis.

Therefore, there is a need for a new method for preparing a sample for wafer level failure analysis to solve the above technical problems.

SUMMARY

Embodiments of the disclosure provide a method for preparing a sample for wafer level failure analysis, which can prepare a sample for failure analysis with an accurate structure size. Thus, the success rate of sample preparation under a premise of low costs can be improved, and the sample will not be damaged.

An embodiment of the disclosure provides a method for preparing a sample for wafer level failure analysis, which includes the following steps that: a plurality of splitting points are formed on a surface of a selected region of a to-be-analyzed sample along a preset direction, the plurality of splitting points being arranged in a straight line; and the to-be-analyzed sample is split by taking the straight line where the plurality of splitting points are located as a splitting line, to expose a cross section of a side surface of the to-be-analyzed sample and form the sample for the wafer level failure analysis.

DETAILED DESCRIPTION

Figure 1A:
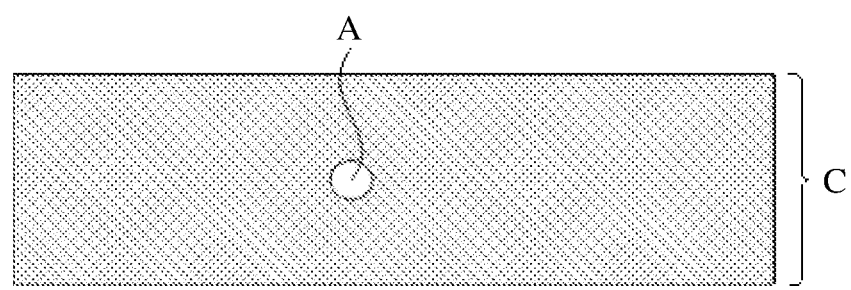
FIG. 1A is a schematic diagram of a target sample before performing manual splitting.
Figure 1B:
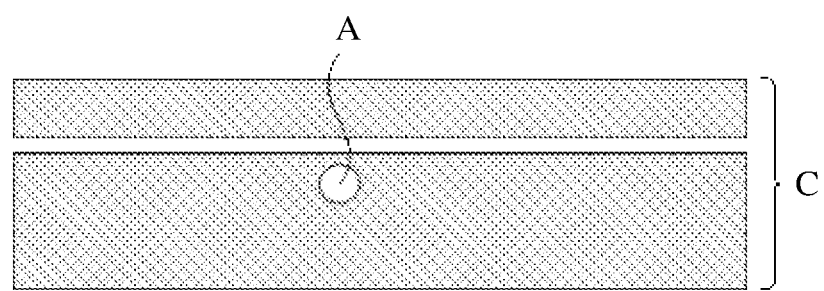
FIG. 1B is a schematic diagram of a target sample after performing manual splitting according to an embodiment of the disclosure.

At present, for some target samples whose analysis structure size is in the micron level, for example, the target samples with a size greater than or equal to 10 μm, due to the limited precision of the manual splitting, the target samples with a desired size may not be accurately obtained. For example, referring to FIG. 1A, FIG. 1A is a schematic diagram of a target sample before performing manual splitting. Assuming that the size of a target point A is 10 μm and the precision of the manual splitting is in a millimeter level, a range in which the manual splitting can act is shown as a region C in FIG. 1A. That is, the splitting position may be located anywhere within the range indicated by the region C when the manual splitting is performed. Referring to FIG. 1B, FIG. 1B is a schematic diagram of a target sample after an operation of manual splitting being performed according to an embodiment of the disclosure. The splitting position is within the range indicated by the region C, but does not pass through the target point A. That is, a side surface of the target point A is not exposed and the sample fails to be prepared. If a certain tool for processing cross section (for example, a focused ion beam analyzer and a device for grinding and polishing) is used, the costs of the focused ion beam analyzer and the device for grinding and polishing are high, and if there is photoresist on a surface of a wafer, the photoresist with poor hardness may be deformed during sample preparation, which will also affect the subsequent failure analysis.

Based on the reasons given above, embodiments of the disclosure provide a method for preparing a sample for wafer level failure analysis. The method can prepare a sample for the failure analysis with an accurate structure size, thus, the success rate of sample preparation under a premise of low costs can be improved, and the sample will not be damaged.

An implementation of the method for preparing the sample for the wafer level failure analysis provided by an embodiment of the disclosure will be described in detail in combination with the accompanying drawings.

Figure 2:
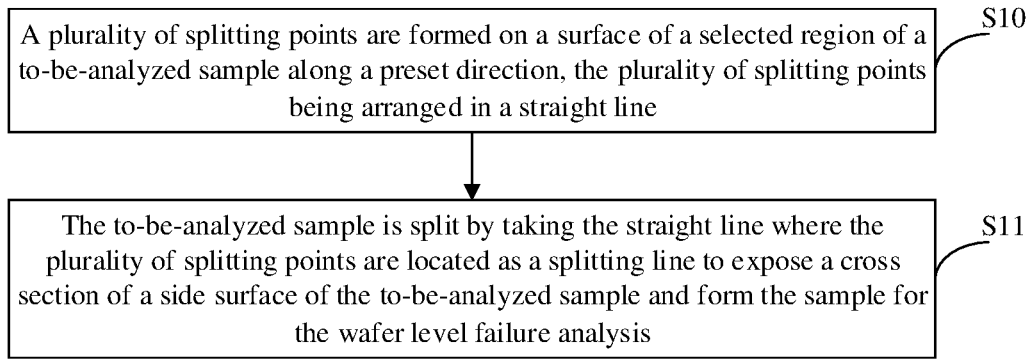
FIG. 2 is a schematic diagram of steps of a method for preparing a sample for wafer level failure analysis according to an embodiment of the disclosure.

FIG. 2 is a schematic diagram of steps of a method for preparing a sample for wafer level failure analysis according to an embodiment of the disclosure. Referring to FIG. 2, a method for preparing a sample for wafer level failure analysis includes the following steps of S10 and S11.

In step S10, a plurality of splitting points are formed on a surface of a selected region of a to-be-analyzed sample along a preset direction, where the plurality of splitting points are arranged in a straight line.

Figure 3:
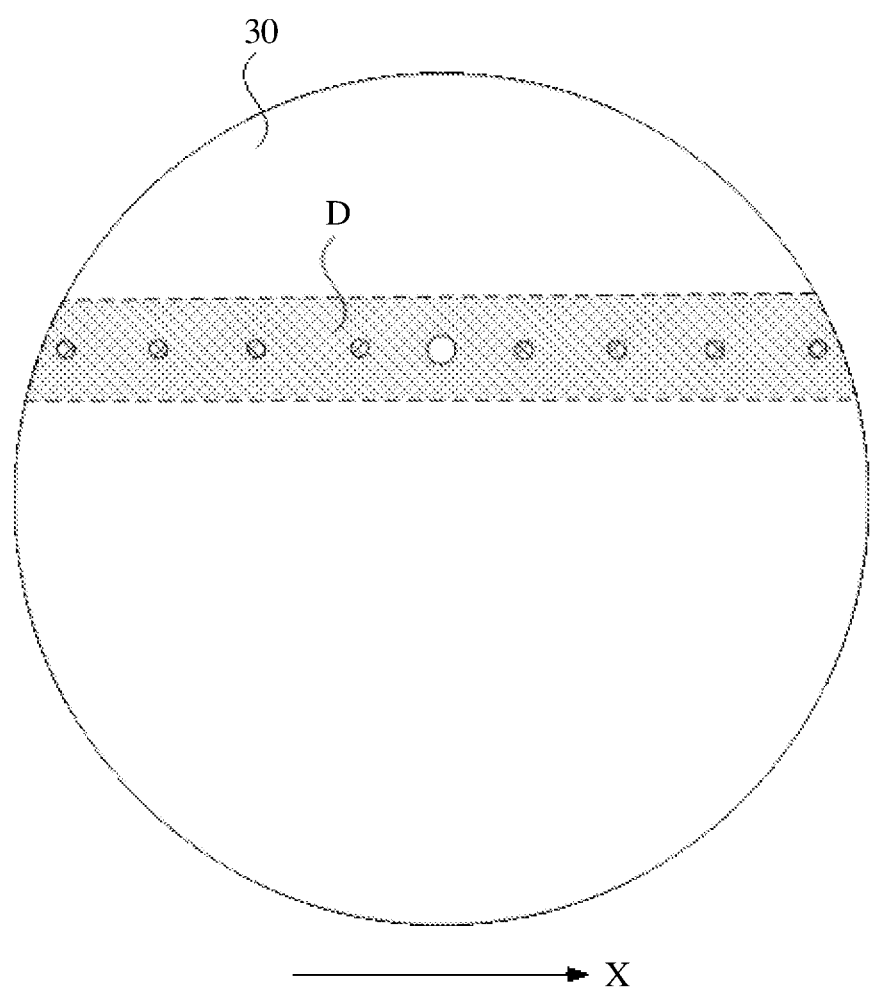
FIG. 3 is a schematic diagram of a to-be-analyzed sample in a method for preparing a sample for wafer level failure analysis according to an embodiment of the disclosure.

In an embodiment of the disclosure, the to-be-analyzed sample may be a wafer level sample. As shown in FIG. 3, FIG. 3 is a schematic diagram of the to-be-analyzed sample. The to-be-analyzed sample 30 may be a wafer. In some embodiments, the to-be-analyzed sample may also be a chip level sample.

The preset direction may be a direction that is required to be split subsequently, that is, in a subsequent splitting step, the to-be-analyzed sample 30 may be split along the preset direction. For example, in an embodiment of the disclosure, if the preset direction is a horizontal direction X, the to-be-analyzed sample 30 may be split along the X direction in the subsequent splitting step. In some embodiments, the preset direction may also be a vertical direction.

In some embodiments, the to-be-analyzed sample 30 may have a monocrystalline semiconductor structure, for example, a semiconductor structure made of monocrystalline silicon or monocrystalline germanium, and the like. Due to characteristics of the monocrystalline semiconductor structure, when the to-be-analyzed sample 30 is split in the horizontal direction or in the vertical direction, a regular and flat splitting interface instead of an irregular and uneven splitting interface can be formed. For example, in an embodiment of the disclosure, the to-be-analyzed sample 30 may have a monocrystalline silicon wafer. Due to characteristics of monocrystalline silicon, a regular and flat splitting interface can be formed when the to-be-analyzed sample 30 is split along the preset direction, thereby facilitating subsequent failure analysis.

In some embodiments, the selected region D may be a target region, that is, the region where the failure analysis is needed to be performed.

Figure 4:
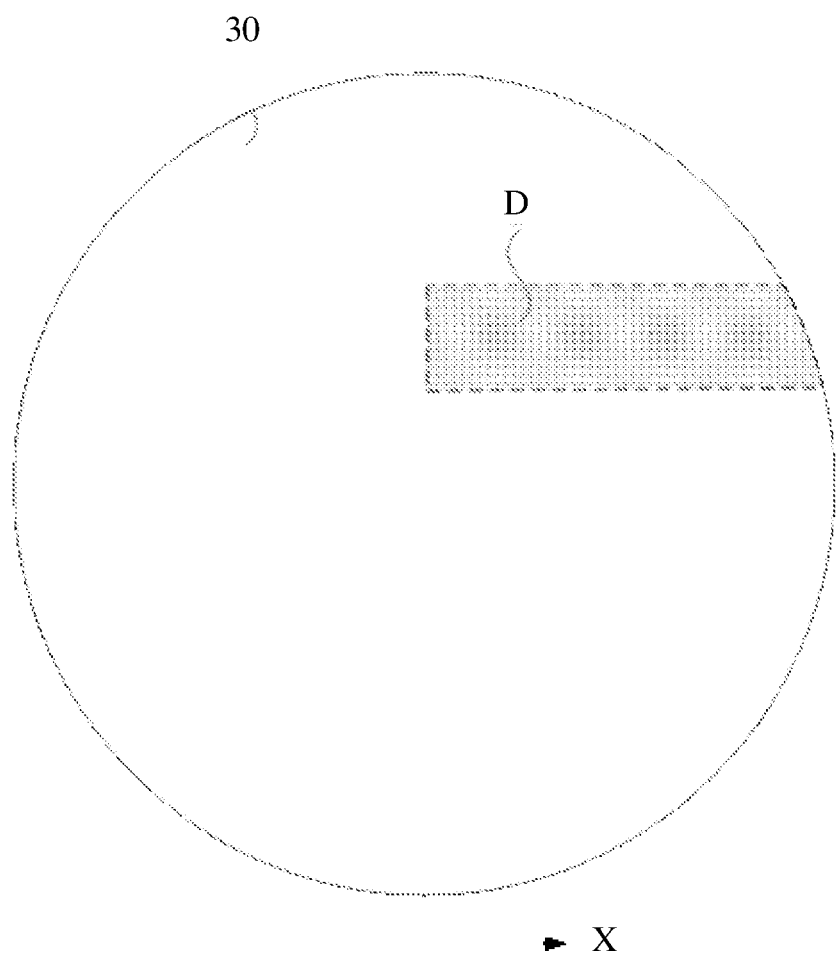
FIG. 4 is a schematic diagram of a to-be-analyzed sample in a method for preparing a sample for wafer level failure analysis according to another embodiment of the disclosure.
Figure 5:
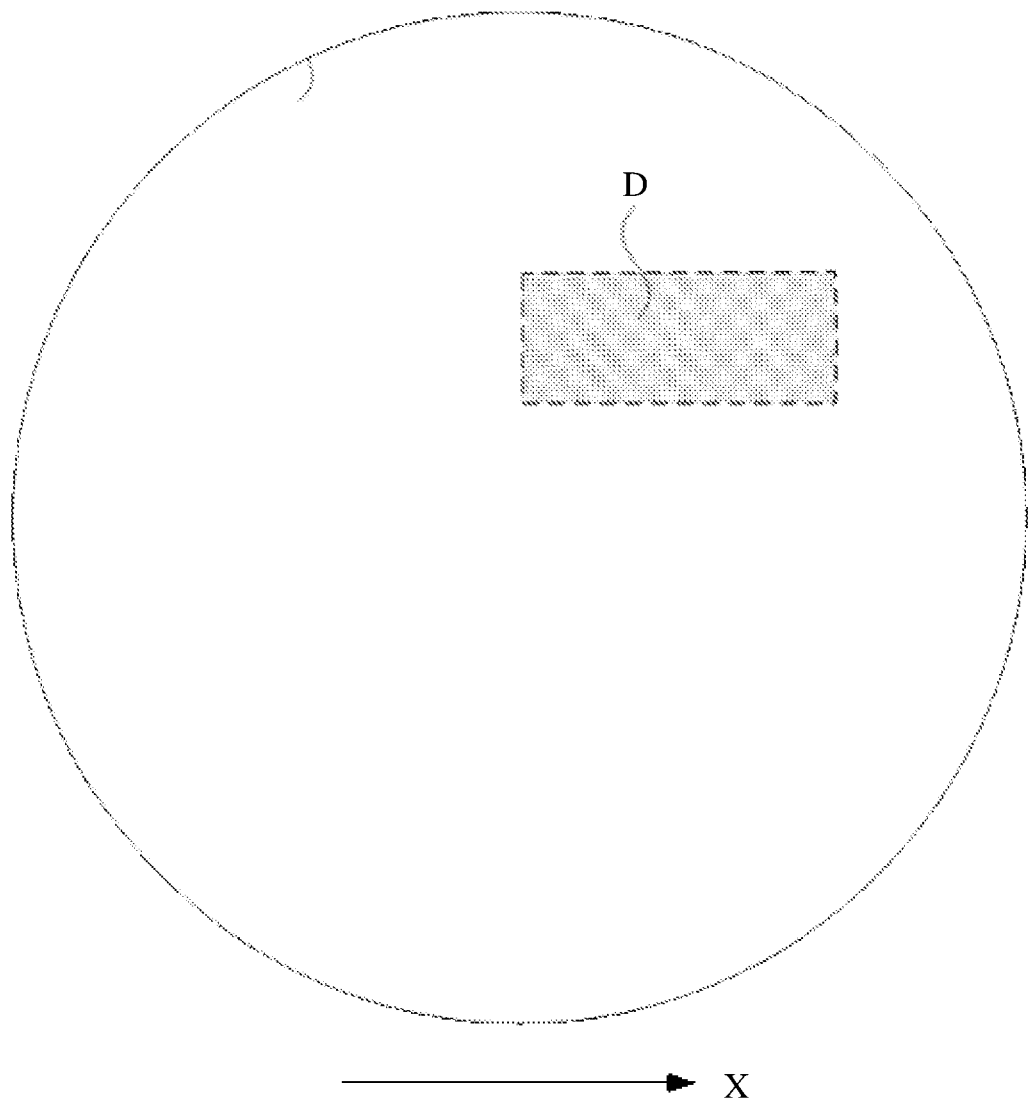
FIG. 5 is a schematic diagram of a to-be-analyzed sample in a method for preparing a sample for wafer level failure analysis according to another embodiment of the disclosure.

In some embodiments, in the preset direction (X-direction), the selected region D may extend from one end of the to-be-analyzed sample 30 to another end of the to-be-analyzed sample 30; that is, the selected region D may penetrate through the to-be-analyzed sample 30. In some embodiments, the selected region D may extend only to one end of the to-be-analyzed sample 30, or, both ends of the selected region D may not extend to an edge of the to-be-analyzed sample 30. For example, as shown in FIG. 4, FIG. 4 is a schematic diagram of a to-be-analyzed sample according to another embodiment of the disclosure. In the embodiment, one end of the selected region D may extend to the edge of the to-be-analyzed sample 30 and another end may not extend to the edge of the to-be-analyzed sample 30 in the preset direction (X direction). As another example, as shown in FIG. 5 FIG. 5 is a schematic diagram of a to-be-analyzed sample according to another embodiment of the disclosure.

In the embodiment, both ends of the selected region D may not extend to the edge of the to-be-analyzed sample 30 in the preset direction (X direction).

Figure 6:
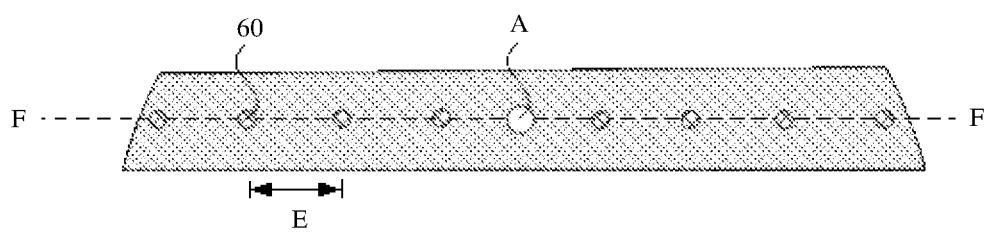
FIG. 6 is an enlarged schematic diagram of a selected region D in FIG. 3.

FIG. 6 is an enlarged schematic diagram of a selected region D in FIG. 3. Referring to FIG. 3 and FIG. 6, a plurality of splitting points 60 may be formed on the surface of the selected region D. The plurality of the splitting points 60 may be arranged in a straight line. The plurality of the splitting points 60 may be arranged along the preset direction. For example, in an embodiment of the disclosure, the plurality of the splitting points 60 may be arranged in a straight line along the X-direction.

Figure 7:
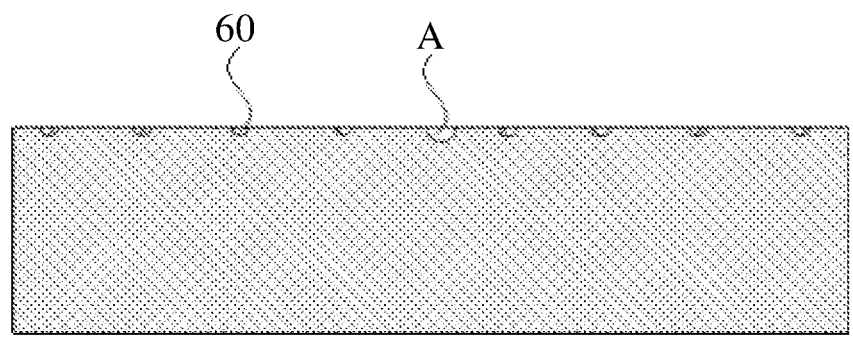
FIG. 7 is a cross-sectional view along a line F-F shown in FIG. 6.

FIG. 7 is a cross-sectional view along a line F-F shown in FIG. 6. Referring to FIG. 7, each of the splitting points 60 may be a defect that is recessed toward the inside of the to-be-analyzed sample 30. The defect may destroy the flatness of the surface of the to-be-analyzed sample 30 and the defect can be taken as a splitting starting position during the subsequent splitting operation, thereby preventing the to-be-analyzed sample 30 from being split at other positions.

In some embodiments, in the method for preparing the sample for the wafer level failure analysis, a target point A may be arranged on the surface of the selected region D of the to-be-analyzed sample, and the plurality of splitting points 60 may be arranged with reference to the target point A.

The target point A may be a point which is marked by a user for the failure analysis, and some distance may be expanded outwards with reference to the target point A to form the selected region D. The target point A may be located on the straight line where the plurality of the splitting points 60 are located. A shape of the target point A may be circular, rectangular, and the like. The target point A may have a width. If the target point A is circular, the width may be a diameter of a circle. If the target point A is rectangular, the width may be a side length of a rectangle along the preset direction. In some embodiments, the width of the target point A may be greater than or equal to 10 μm, which will not be limited herein.

The plurality of the splitting points 60 may be arranged with reference to the target point A. In some embodiments, the plurality of the splitting points 60 may be arranged with reference to the position of the target point A. For example, in the embodiment, the plurality of the splitting points 60 may be arranged in front of and behind the target point A along the preset direction (X direction). In some embodiments, the plurality of the splitting points 60 may also be arranged on only one side of the target point A. In some embodiments, a center point of the target point A may be located on the line F-F where the center point of the plurality of the splitting points 60 is located.

In some embodiments, the splitting points 60 may be arranged at an equal interval. For example, in the embodiment of the disclosure, the plurality of the splitting points 60 may be arranged on both sides of the target point A, and the plurality of the splitting points 60 on the same side may be arranged at the equal interval. In other embodiments, all of the plurality of the splitting points 60 may be arranged at the equal interval.

In some embodiments, the plurality of the splitting point 60 may have a width in the preset direction (X-direction). If the plurality of the splitting points 60 are circular, the width may be a diameter of a circle. And if the plurality of the splitting points 60 are rectangular, the width may be a side length of the rectangle along the preset direction. An interval E between the splitting points 60 may be in a range of 2 to 4 times of the width. Therefore, the splitting interface of the sample for wafer level failure analysis obtained in the subsequent splitting step can be flat, and the error may be small. If the interval between the splitting points 60 is too large, a regional splitting interface between the splitting points 60 will be uneven. And if the interval between the splitting points 60 is too small, a preparing procedure and time will be wasted, which is adverse to reducing material and time costs. In some embodiments, the interval between the splitting points 60 may refer to an interval between the center points of the plurality of the splitting points 60.

In an embodiment of the disclosure, the plurality of the splitting points 60 may have a certain depth. The depth may be 0.05 to 0.5 times of a thickness of the to-be-analyzed sample 30. If the depth of the plurality of the splitting points 60 is too deep, the plurality of the splitting points 60 may destroy the structure of the to-be-analyzed sample 30, thereby causing failure of the sample preparation for the failure analysis. And if the depth of the splitting points 60 is too shallow, the plurality of the splitting points 60 may not be taken as an effective splitting starting position, and then the purpose of the embodiment of the disclosure cannot be achieved.

In some embodiments, the width of the plurality of the splitting points 60 may be smaller than the width of the target point A, so that a splitting line can pass through the target point A. That is, the target point A may be just split to prepare a sample for failure analysis that meets the requirements.

In some embodiments, the splitting points 60 may be formed by knocking the surface of the selected region D of the to-be-analyzed sample 30 by using an automated hardness tester. The Automated Hardness Tester (AHT) can adjust a knocking force to form substantially same splitting points, which can avoid the unevenness of the split interface caused by the difference of the plurality of the splitting points. For example, in some embodiments, a constant knocking force may be applied by the automated hardness tester to form the substantially same splitting points. The knocking force may be arranged as 10 grams (g), 25 g, 50 g, 100 g, or 200 g. And the diameter of each of the formed splitting points may be 4 μm, 7 μm, 10 μm, 15 μm, or 20 μm respectively. In another embodiment, the knocking force of the automated hardness tester may vary according to a surface hardness of the to-be-analyzed sample, to form the substantially same splitting points. In addition, the automatic hardness tester can arrange a knocking interval, so that the plurality of the splitting points can be easily arranged at an equal interval, and the flatness of the split interface can be further ensured.

In some embodiments, the splitting points may be formed on the surface of the to-be-analyzed sample by using the existing automated hardness tester, and the process may be simple, and no additional costs will be added.

Referring to step S11, the to-be-analyzed sample 30 is split by taking the straight line where the plurality of splitting points 60 are located as a splitting line, to expose a cross section of a side surface of the to-be-analyzed sample 30 and form the sample for the level failure analysis.

Figure 8:
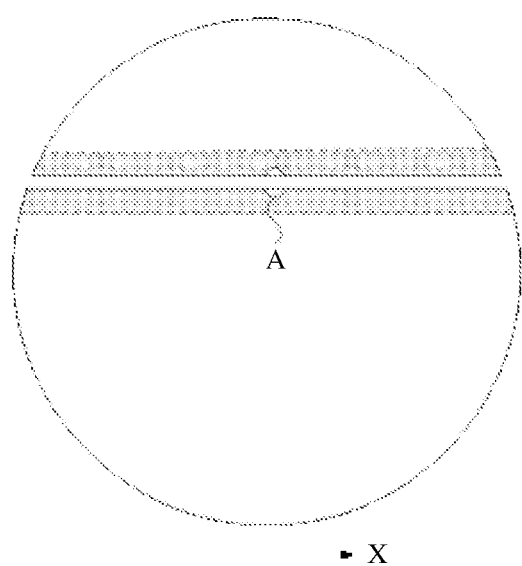
FIG. 8 is a top view of a to-be-analyzed sample after being split in a method for preparing a sample for wafer level failure analysis according to an embodiment of the disclosure.

In the embodiment of the disclosure, FIG. 8 is a top view of a to-be-analyzed sample after being split in a method for preparing a sample for wafer level failure analysis according to an embodiment of the disclosure. Referring to FIG. 8, the to-be-analyzed sample 30 may be split, the cross section of the side surface thereof may be exposed, and the sample for the wafer level failure analysis may be formed. Due to the presence of the splitting points 60, the formed splitting interface will be flat, and the splitting interface can just pass through the target point A, to meet a requirement.

In some embodiments, the to-be-analyzed sample 30 may be split by manual splitting. In the selected region D, due to the presence of the splitting points 60, the splitting interface can only extend along the straight line where the splitting points 60 are located, so that a situation that the splitting interface is uneven caused by the manual splitting can be avoided. In some embodiments, since the to-be-analyzed sample 30 is the monocrystalline semiconductor structure, the splitting interface will not be disordered in a direction perpendicular to the surface of the to-be-analyzed sample 30 due to the characteristics of the monocrystalline semiconductor structure. Thus, the flat splitting interface can be formed, and the sample for the failure analysis that meets the requirement can be prepared.

For the case that the selected region D shown in FIG. 3 extends from one end of the to-be-analyzed sample 30 to another end of the to-be-analyzed sample 30, the to-be-analyzed sample 30 may be manually split from the edge of the to-be-analyzed sample 30. For the case that the selected region D shown in FIG. 4 and FIG. 5 does not penetrate through the to-be-analyzed sample 30, the to-be-analyzed sample 30 may also be split by a manual splitting method. In the selected region D, due to the presence of the splitting points, the to-be-analyzed sample 30 may be split directly along the straight line where the splitting points are located. Other regions are not the target region for the failure analysis, and whether to form the flat splitting interface in the other regions will not affect the sample preparation of the failure analysis.

According to the method for preparing the sample for the wafer level failure analysis provided by the embodiments of the disclosure, the sample for failure analysis meeting the requirement can be prepared. And for the structure with the photoresist on the surface of the to-be-analyzed sample, the photoresist with low hardness will not deform.

The above descriptions are merely some embodiments of the disclosure. It should be pointed out that those of ordinary skill in the art may further make multiple improvements and modifications without departing from a principle of the embodiments of the disclosure, and those improvements and modifications should also be considered as the protection scope of the embodiments of the disclosure.

The invention claimed is:

1. A method for preparing a sample for wafer level failure analysis, the method comprising:
  forming a plurality of splitting points on a surface of a selected region of a to-be-analyzed sample along a preset direction, wherein the plurality of splitting points are arranged in a straight line; and
  splitting the to-be-analyzed sample by taking the straight line where the plurality of splitting points are located as a splitting line, to expose a cross section of a side surface of the to-be-analyzed sample and form the sample for the wafer level failure analysis;
  wherein a target point is arranged on the surface of the selected region of the to-be-analyzed sample, and the plurality of splitting points are arranged with reference to the target point, wherein the target point is located on the straight line where the plurality of splitting points are located;
  wherein the plurality of splitting points are arranged in front of and behind the target point along the preset direction;
  wherein the plurality of splitting points are arranged at an equal interval;

wherein each of the plurality of splitting points has a width in the preset direction, and the interval is in a range of 2 to 4 times the width;

wherein the width of each of the plurality of splitting points is smaller than a width of the target point in the preset direction;

wherein the plurality of splitting points are formed by knocking the surface of the selected region of the to-be-analyzed sample by using an automated hardness tester;

wherein a constant knocking force is applied by the automated hardness tester on the surface of the selected region of the to-be-analyzed sample.

2. The method for preparing the sample for the wafer level failure analysis of claim 1, wherein the preset direction is a vertical direction or a horizontal direction.

3. The method for preparing the sample for the wafer level failure analysis of claim 1, wherein the selected region extends from one end of the to-be-analyzed sample to another end of the to-be-analyzed sample in the preset direction.

4. The method for preparing the sample for the wafer level failure analysis of claim 1, wherein a depth of each of the plurality of splitting points is 0.05 to 0.5 times of a thickness of the to-be-analyzed sample.

5. The method for preparing the sample for the wafer level failure analysis of claim 1, wherein the to-be-analyzed sample has a monocrystalline semiconductor structure.

\* \* \* \* \*